United States Patent
Blackburn et al.

(10) Patent No.: US 8,583,952 B2
(45) Date of Patent: *Nov. 12, 2013

(54) POWER MANAGEMENT OF COMPUTERS BASED ON USER INACTIVITY AND POWER STATE REQUIREMENTS FOR ACTIVE PROCESSES

(75) Inventors: Mark Blackburn, London (GB); Sophie Chang, London (GB)

(73) Assignee: 1eLimited (GB)

( * ) Notice: Subject to any disclaimer, the term of this patent is extended or adjusted under 35 U.S.C. 154(b) by 363 days.

This patent is subject to a terminal disclaimer.

(21) Appl. No.: 12/980,988

(22) Filed: Dec. 29, 2010

(65) Prior Publication Data
US 2011/0161707 A1 Jun. 30, 2011

(30) Foreign Application Priority Data
Dec. 30, 2009 (GB) .................................. 0922645.7

(51) Int. Cl.
G06F 1/32 (2006.01)
G06F 1/00 (2006.01)
G06F 1/26 (2006.01)
G06F 9/46 (2006.01)

(52) U.S. Cl.
USPC ............ 713/323; 713/300; 713/320; 718/100

(58) Field of Classification Search
None
See application file for complete search history.

(56) References Cited

U.S. PATENT DOCUMENTS

| | | | |
|---|---|---|---|
| 5,504,910 A | 4/1996 | Wisor et al. | |
| 5,511,203 A | 4/1996 | Wisor et al. | |
| 5,664,205 A | 9/1997 | O'Brien et al. | |
| 5,754,869 A | 5/1998 | Holzhammer et al. | |
| 6,684,341 B1 | 1/2004 | Malcolm et al. | |
| 7,646,197 B2 * | 1/2010 | Misaka et al. | 324/300 |
| 8,392,734 B2 * | 3/2013 | Blackburn et al. | 713/320 |
| 2001/0034850 A1 | 10/2001 | Atkinson | |
| 2003/0163742 A1 | 8/2003 | Lam | |
| 2004/0250147 A1 | 12/2004 | Chang | |
| 2005/0182612 A1 | 8/2005 | Anderson et al. | |
| 2007/0022309 A1 | 1/2007 | Adamo et al. | |
| 2007/0283176 A1 | 12/2007 | Tobias et al. | |

(Continued)

FOREIGN PATENT DOCUMENTS

| GB | 2 287 555 A | 9/1995 |
|---|---|---|
| GB | 2443307 A | 4/2008 |

OTHER PUBLICATIONS

Search Report in corresponding GB0922645.7, dated Apr. 20, 2010; mailed Apr. 21, 2010; 3 pages.

*Primary Examiner* — Ji H Bae
(74) *Attorney, Agent, or Firm* — Wall & Tong, LLP

(57) ABSTRACT

A method of controlling power consumption in a computer by detecting whether or not there is any user activity, and also the identity of each process running on the computer. The identity of each process running on the computer is compared with a set of identities of previously identified processes, these having been deemed to be processes for which it is desirable that the computer maintains a high power state. The computer adopts a low power state if all the detected identities of processes are not in the set of high power state processes or no user activity is detected. The low power state is a state in which the computer is able to service requests. The computer freely adopts any available higher power state if user activity is detected or a detected process is in the set of high power state processes. The power state selected may depend on workload.

19 Claims, 7 Drawing Sheets

(56) References Cited

U.S. PATENT DOCUMENTS

| | | |
|---|---|---|
| 2008/0082752 A1 | 4/2008 | Chary et al. |
| 2008/0104438 A1 | 5/2008 | Yokoyama et al. |
| 2009/0204830 A1 | 8/2009 | Frid et al. |
| 2010/0185882 A1* | 7/2010 | Arnold et al. ............... 713/320 |
| 2011/0239019 A1* | 9/2011 | Johnston ..................... 713/323 |

* cited by examiner

Schematic of Admin workstation and database

Schematic of PC 2n

POWER MANAGEMENT OF COMPUTERS BASED ON USER INACTIVITY AND POWER STATE REQUIREMENTS FOR ACTIVE PROCESSES

FIELD OF THE INVENTION

The present invention relates generally to power management of computing devices.

BACKGROUND OF THE INVENTION

Computers consume electrical energy and reducing energy consumption reduces the costs of running computers. A company may run a very large number of computers. A small saving in energy consumption on each computer results in a large overall saving of energy and thus cost for the company.

It is known to provide control of the power state of a CPU of a computer. In one system, for example Intel's Speedstep, the CPU is designed to adopt, under the control of a power management program, any one of a plurality of power states $P0$ to $Pn$, where $P0$ is the highest power state and $Pn$ is the lowest.

The value of n depends on the design of the CPU. If the computer is idle the operating system causes the computer to adopt the lowest power state $Pn$. If any activity is detected a higher power state $P0$ to $P(n-1)$ is adopted according to the workload of the CPU. Normally the $P0$ state is adopted.

SUMMARY OF THE INVENTION

In accordance with various embodiments of the present invention, there is provided a method of controlling power consumption in a computer having a plurality of selectable power states, the method comprising using a power management program installed on the computer to: detect whether or not there is any user activity;

detect the identity of each process running on the computer;

compare the identity of each process running on the computer with a set of identities of previously identified processes for which it is desirable that the computer maintains a high power state;

cause the computer to adopt a predetermined lower power state if all the detected identities of processes are not in the set and no user activity is detected, the lower power state being a state in which the computer is able to service requests.

The various embodiments allow a computer to be active in a lower power state if no "useful" activity, as represented by the set of previously identified processes, is occurring but the computer is quickly fully available once user input is detected. In an embodiment of the invention the lowest power state is selected being the lowest power state in which the computer is able to service requests.

In one embodiment the computer selects any of the power states if user activity is detected or a detected process is in the set. Thus if, in the low power state, a process which is a member of the set is initiated, the computer may select any power state according to a criterion. The power state selected may depend on the workload of the CPU.

In various embodiments of the invention, the set of identities of previously identified processes is a list created by a user or an administrator.

In accordance with various other embodiments of the present invention, there is provided a method of controlling power consumption in a computer, wherein a CPU of the computer has a plurality of power states $P0$ to $Pn$ where $P0$ is the highest power state and $Pn$, $n>0$, is/are a lower power state(s), the method comprising using a power management program installed on the computer to:

cause the CPU to adopt the lowest power state $Pm$, where m is the highest value of n supported by the CPU, if all the detected identities of processes are not in the set and no user activity is detected, the lowest power state being a state in which the computer is able to service requests; and allow the computer to adopt any one of the power states $P0$ to $Pn$ otherwise.

Thus if, in the lowest power state, a process which is a member of the set is initiated, the computer may adopt any power state $P0$ to $Pn$. The power state selected may depend on the workload of the CPU.

Further features and advantages of the invention will become apparent from the following description of illustrative embodiments of the invention, given by way of example only, which is made with reference to the accompanying drawings.

DETAILED DESCRIPTION OF ILLUSTRATIVE EMBODIMENTS OF THE INVENTION

Overview

The embodiment of the invention described with reference to FIGS. 1 to 8 comprises a computer which may adopt two or more active power states. The activity of the computer is monitored and it is forced it into the lowest power active state in which it is still able to service requests if there is no user activity and there are no processes active on the computer which are in a predetermined set of processes which are deemed to be processes for which it is desirable that the computer maintains a higher power state. The processes of the set are referred to herein as "good" processes. The purpose is to force the computer into its lowest active power state if no "useful" activity is occurring to reduce power consumption. If user activity occurs and/or a good process is, or becomes, active, the computer is free to adopt any suitable power state. In this way, power consumption is reduced but the computer is quickly fully available once user input is detected or a process of the set is initiated. In its lowest active power state the computer may carry out tasks such as defragmentation and/or virus checking, which, whilst important, do not provide a service to a user. The lowest power state in which the computer is able to service requests is referred to hereinafter as a "drowsy state".

A Networked Computer System According to an Embodiment of the Invention

Figure 1:
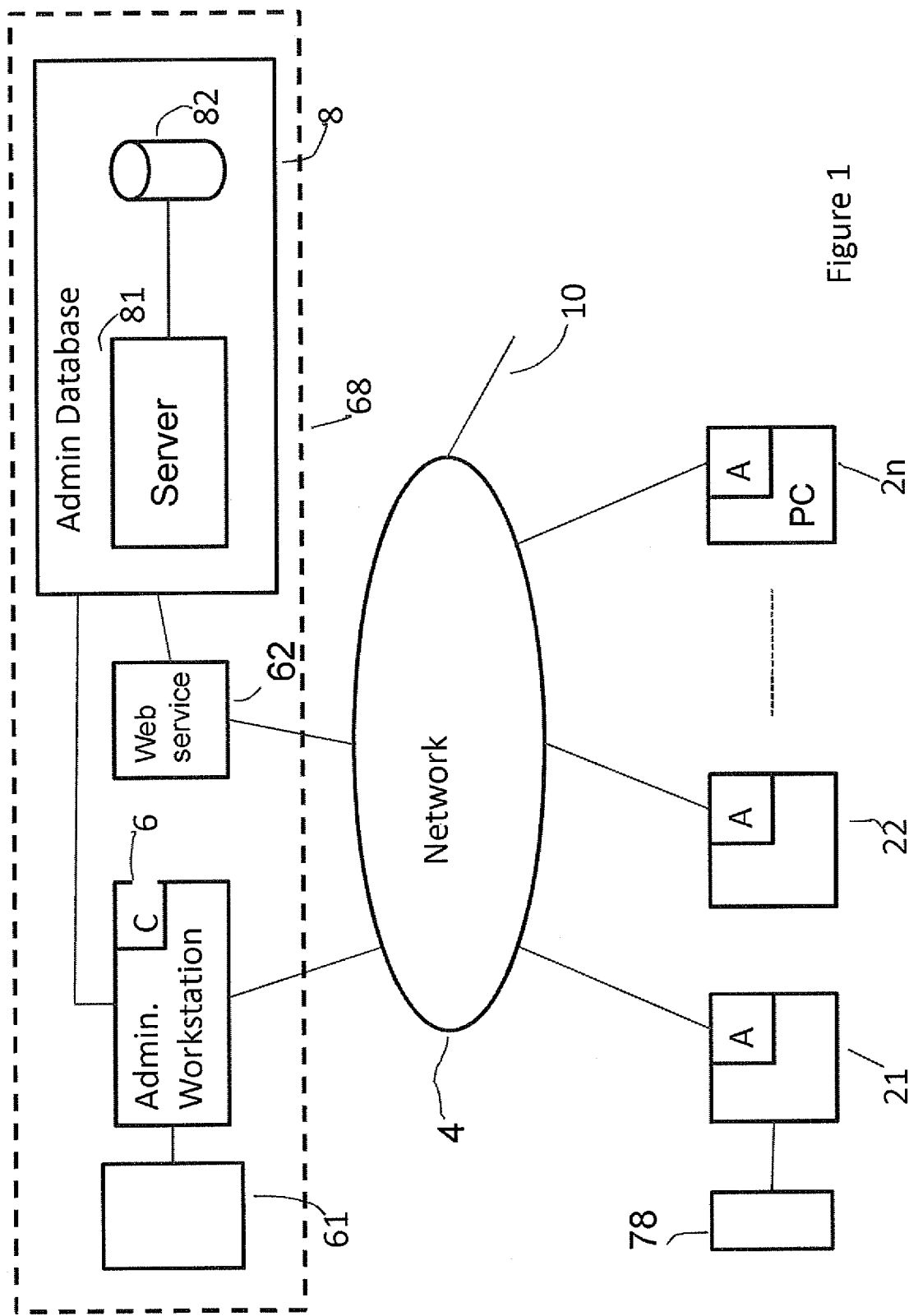
FIG. 1 is a schematic block diagram of computers in a network.

Referring to FIG. 1, the system comprises computers, in this example PCs, 21, 22, 2n, an administrator's workstation 6 with a display device 61, a web service 62 running on a computer, and an administrative database 8 connected by a network 4. The administrator's workstation interacts with the database 8. The web service 62 interacts with the database and the PCs 2n. The PCs 21 to 2n may be a large number of PCs, for example hundreds or more PCs. The database may itself comprise a server 81 having a data storage device 82. The database 8 and the workstation 6 together form a monitoring system 68. As shown at 78 in FIG. 1 one or more of the PCs has at least one input device for example a keyboard, a pointing device or any other user input device.

Figure 2:
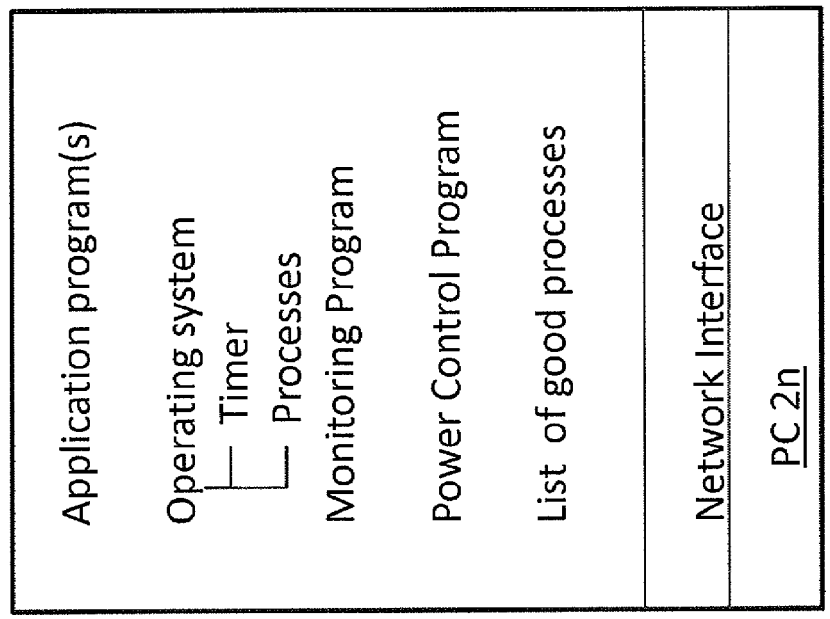
FIG. 2 is a schematic diagram of a computer of the network of FIG. 1.

In this example of the invention, as illustrated in FIG. 2, each PC 2n has, amongst other programs: an operating system; one or more application programs; and a network interface. Each PC 2n has a power control program denoted A in FIG. 1 which monitors activity of the PC and controls the power state of the PC as described herein. The power control program interacts with the operating system to obtain data relating to the activities of the computer. Power control is performed on the basis of settings downloaded by the PC 2n from the database. The settings are created by the administrator.

Figure 3:
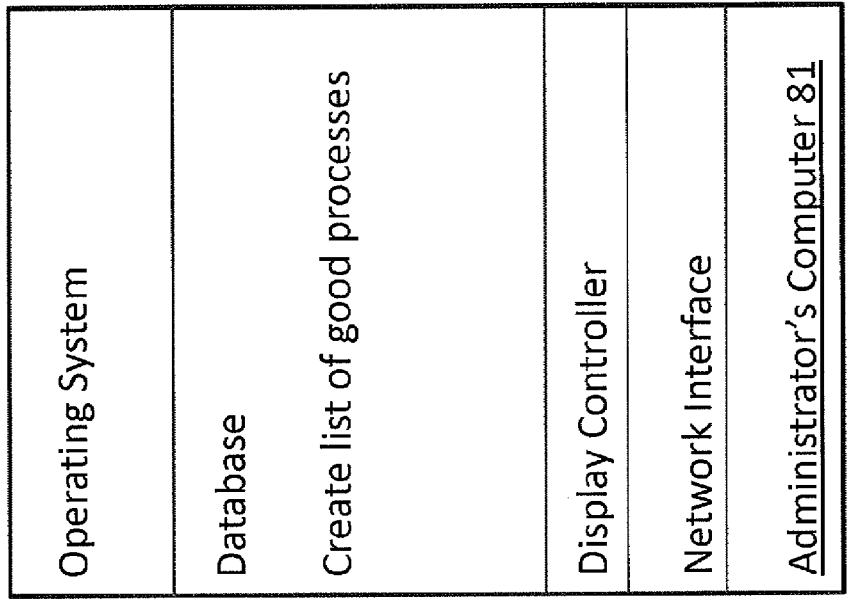
FIG. 3 is a schematic diagram of an administrator's workstation of the network of FIG. 1.

In this example, as indicated in FIG. 3, the administrator's workstation 6 has, amongst other programs, an operating system, a network interface, a display controller, and a program for interfacing with the database.

Figure 4:
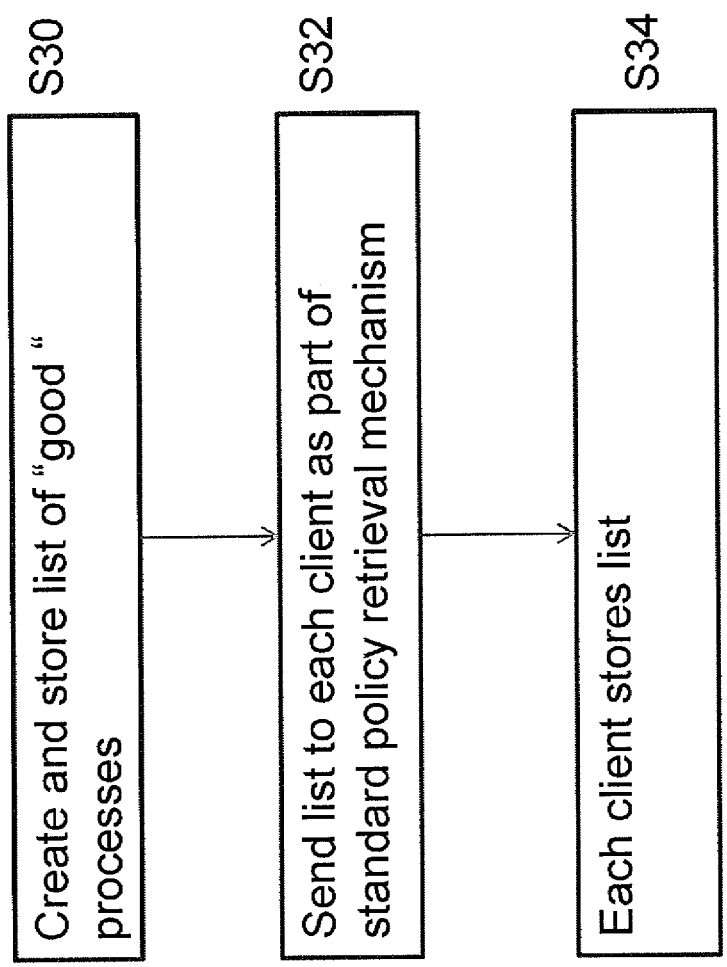
FIG. 4 is a flowchart of an operation carried out by an administrator.

Referring to FIG. 4, in this embodiment, the administrator manually creates S32 a list of "good" processes which he considers should be allowed to run on a PC 2n of the system of FIG. 1, with the PC running at full power. In contrast other processes, for example management tasks which do not provide a service directly useful to a user, are not listed. Examples of such tasks include defragmentation and virus checking.

In this example the administrator produces the list listing the "good" processes: i.e. processes which should be allowed to maintain a PC 2n in a high power state whether or not there is user activity. In step S30 the list is stored in the database 14. In step S32 the list is sent to each client computer, i.e. each PC 2n, as part of the policy retrieval mechanism which is standard practice in networked computer systems. In step S34, the list is stored in the client 2n. The PCs in the network may be grouped and different groups may have different lists.

Figure 5:
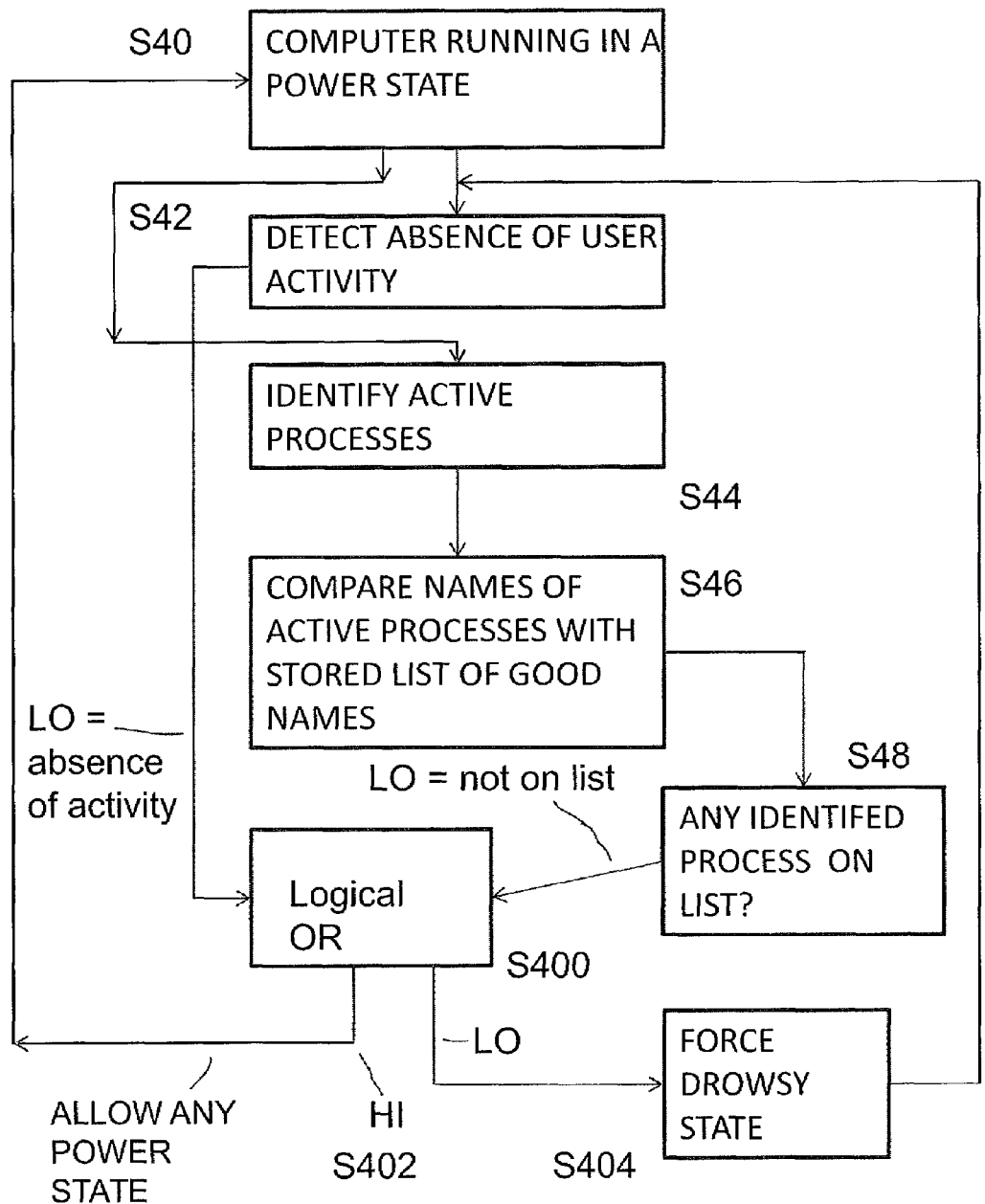
FIG. 5 is a flow chart of a procedure carried out in a computer for managing power consumption.

Referring to FIG. 5, consider a PC 2n of FIG. 1. The PC 2n may adopt any of two or more power states in which the computer is active, i.e. it is able to service requests. In this embodiment there are two power states, a higher power state and a lower power state. The PC 2n has the stored list produced by the procedure of FIG. 4. In step S40, assume, for the sake of convenience of description, the PC is initially running a process or processes in the higher power state. In step S42, the power management program detects absence of user activity. In step S44 the operating system identifies the active processes. The names of the active processes are compared with the names on the stored list of good processes by the power manager in step S46. In step S48 it is established if any of (i.e. at least one of) the active processes identified in step S44 is/are on the list of good processes.

Step S400 implements a logical OR function as follows, in which the logical value of the inputs are:

presence of user activity=1, absence of user activity=0;
presence of at least one good process=1, absence of any good process=0; and
the logical values of the outputs are logical 0=forced drowsy state and logical 1=freely select any available power state.

| User Activity | Process | Output |
| --- | --- | --- |
| 1 | 0 | 1 |
| 0 | 0 | 0 |
| 1 | 1 | 1 |
| 0 | 1 | 1 |

In brief, if there is no user activity and there is no good process running, the "drowsy" power state is forced as indicated at S404. If there is user activity or at least one good process is running, the power state is freely selectable by the operating system as indicated at S40. For example if a good process is running on the computer, it may be in an idle condition in which case the computer remains in its lower power state whilst the idle condition is maintained. The operating system selects the power state according to a criterion, for example the work load of the computer. In this example, the drowsy state is a state in which the CPU of the computer is active and thus able to service requests but its clock frequency is set to its lowest running state and is thus active in its lowest active power state.

Detecting User Inactivity

Figure 6:
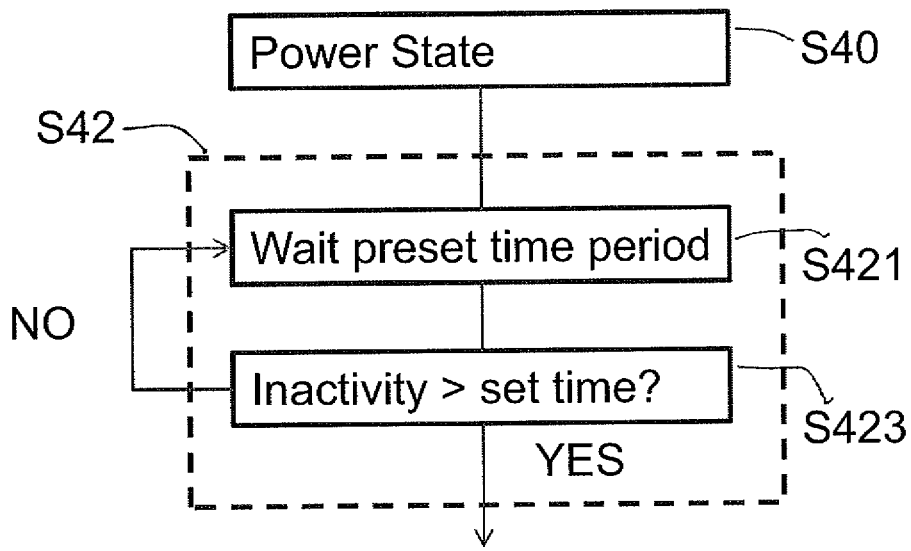
FIG. 6 is a flow chart of a process for detecting user inactivity.
Figure 7:
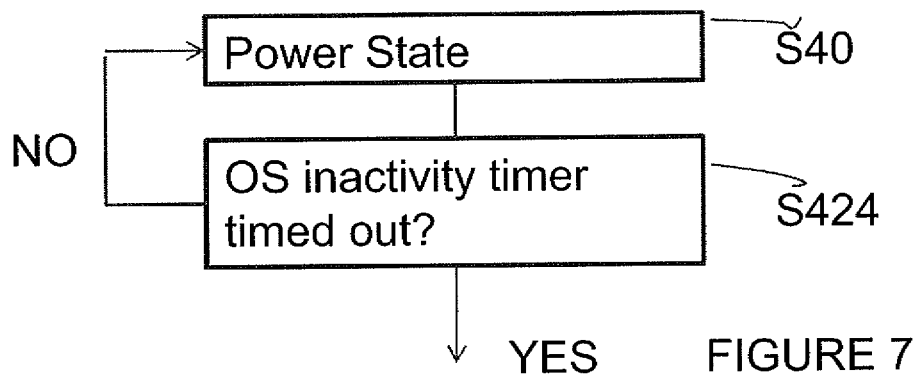
FIG. 7 is a flow chart of an alternative process for detecting user inactivity.

The step S42 of detecting absence of user activity may be carried out in various ways, two examples of which are shown in FIGS. 6 and 7.

Referring to FIG. 6, assume at step S40 a PC 2n is operating in a high power state. Step S42 comprises a step S421 of periodically sampling input activity, for example operation of a keyboard or pointing device. Such activity is indicated by the operating system. The period of sampling for input activity is selectable by the user/administrator. The period may be 7.5 seconds for example, but any other suitable period can be selected. In step S423, if no activity is detected over a set time which is selectable by the user/administrator, a signal indicating inactivity is produced. The set time of step S423 is longer than the sampling period.

Referring to FIG. 7, the signal indicating inactivity is produced by the operating system. An operating system, for example Windows (Trade Mark), provides a display control signal which controls the power to the display of the computer. If no input activity is detected over a set time, selectable by the user/administrator, the display is turned off. Step S424 uses the display control signal produced by the operating system to indicate activity and inactivity by the user.

Figure 8:
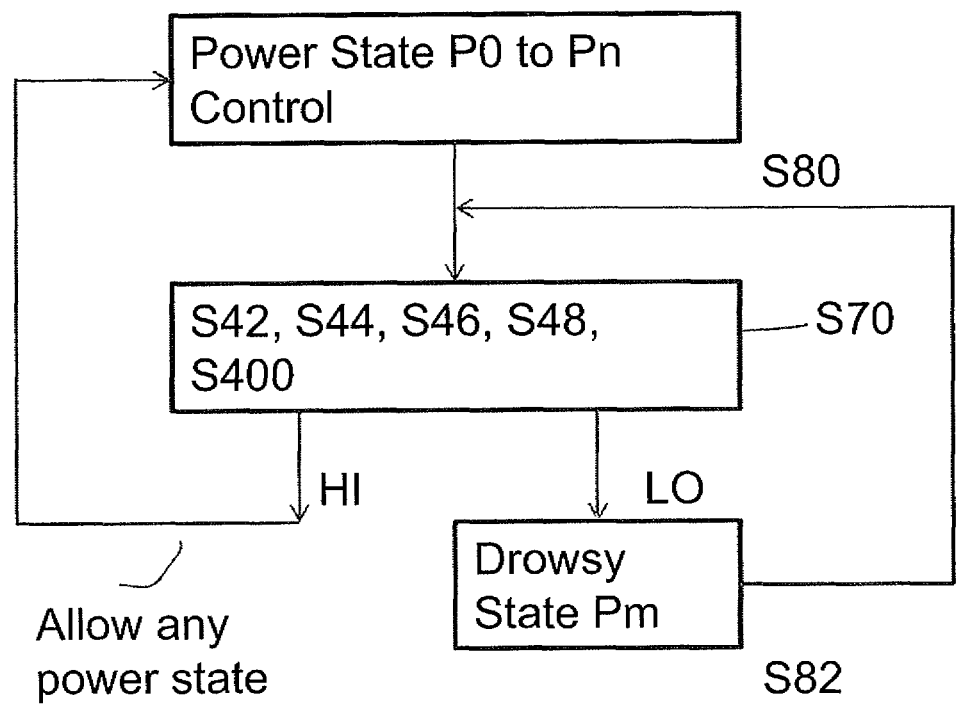
FIG. 8 is a flow chart of a modification of the procedure of FIG. 5 for managing power consumption.

Power States FIG. 8

In the embodiment of the invention described above, a PC 2n can select two power states, a full power state and a lower power state in which it is able to service requests.

In another embodiment the PCs 2n have CPUs which are designed to operate in two or more power states known as P states and denoted as P0 to Pn where each power state Pn is a combination of CPU voltage and frequency. The higher the value of n, ($0 \leq n \leq 16$), the lower the power. Such power states are known as "Speedstep" in Intel processors, or "Cool'n'Quiet" in AMD processors amongst others. The number n of P-states available in a CPU depends on its hardware design. P0 is the highest power state set by the highest clock frequency and the highest voltage. The power state P0 to Pn is controlled by the operating system and a state may be selected dependent on the workload of the CPU. In the embodiments of the invention described herein, the "Drowsy State" corresponds to P$m$ where m is the highest value of n, and thus the lowest clock frequency and voltage, supported by the particular CPU used in the PC. The computer is forced to adopt the drowsy state P$m$ if there is no user activity and there is no good process running. If there is user activity or at least one good process is running, any of the power states P0 to P$n$ is freely selectable by the operating system according to the selection criteria of the operating system. The power state selected may depend on the workload of the CPU.

Referring to FIG. 8, assume the PC is operating in one of the higher power states P0 to P(m−1) as indicated at step S80. Procedure S70, which comprises steps S42, S44, S46, S48 and S400 of FIG. 5, detects if there is no user activity and there is no good process running: if so, the drowsy power state P$m$ is forced as indicated at S82. If there is user activity or at least one good process is running, any power state P0 to P$n$ is freely selectable or maintained as indicated at S80. If the CPU is in the drowsy state P$m$ and user activity or a good process is detected by procedure S70, any power state P0 to P$n$ (including the drowsy state P$m$) is selectable according to the workload of the CPU.

In the embodiment of FIG. 8, if there is no user activity and there is no good process running, the PC is forced to adopt the lowest power state P$m$ otherwise the operating system is allowed to select any power state P0 to P$n$.

FIG. 9

Figure 9:
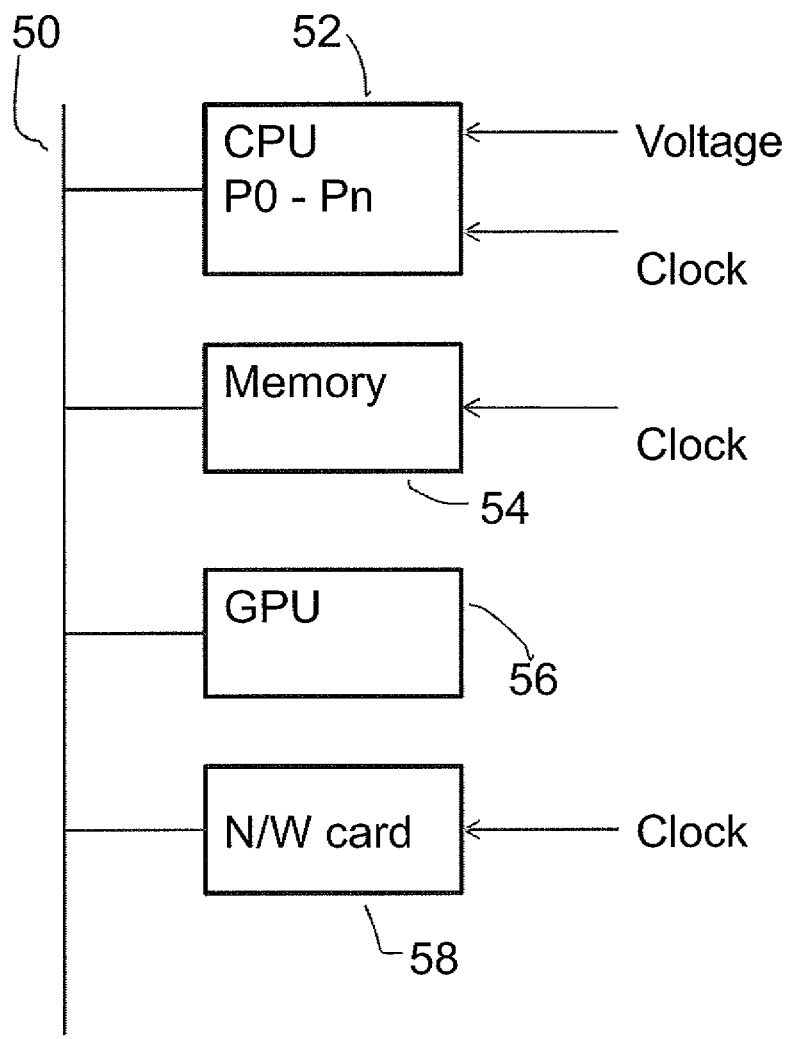
FIG. 9 is a schematic diagram of a computer.

Referring to FIG. 9 a PC 2$n$ may comprise, amongst other conventional components: a CPU 52 which receives or generates a CPU clock and has an operating voltage; a memory 54 which has a memory clock; a graphics processor GPU 56; and a network card 58 which is also subject to a clock signal. The components of the computer are linked buy one or more busses 50.

The embodiments of FIGS. 1 to 8 control the power of only the CPU. However in addition to controlling the power of the CPU one or more the following actions may be taken to further reduce power consumption in the drowsy state: the clock frequency of the memory may be reduced; the clock frequency of the network card may be reduced; and control graphics parameters to reduce power consumption—for example reduce graphics resolution and/or colour depth.

Figure 10:
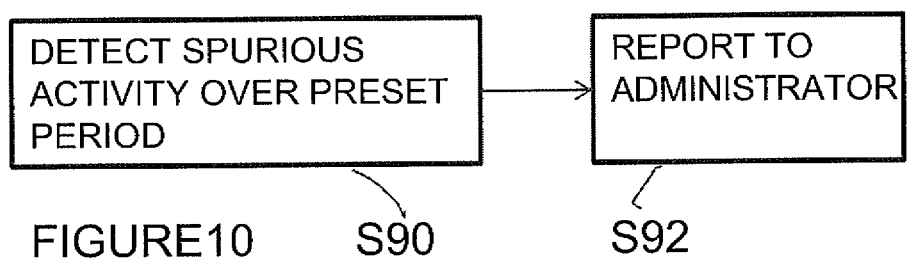
FIG. 10 is a flow chart of a procedure for detecting spurious input activity.

Report Spurious user activity FIG. 10

The examples described above operate at least partly on the basis of the detecting whether or not there is any user input. An input device may be faulty and produce signals indicative of user input even when not in use by a user. There are also simulation programs which simulate user input for the purpose of preventing a computer adopting a low power state. When for example a user views a video there is no input from the user. Some power management programs detect the absence of input from the user and put the computer in a low power state after a set time interrupting the video. A simulation program may be used to override the power management program so a video can be viewed uninterrupted. Inputs from simulation programs and from faulty devices are referred to hereinafter as spurious input activity. Thus an embodiment provides a method of detecting such spurious input activity and in this example reporting it to the administrator. The method comprises checking input activity at preset intervals over a preset period of time and determining input activity is spurious if input activity is found at every checking interval S90 over the preset period. If so, the presence of such activity is reported S92 to the administrator. For example, data indicating the spurious activity is stored in the database 14 to be accessed by the administrator.

Computer Programs

The invention also provides a computer program which when run on a PC 2$n$ implements the procedures described above with reference to FIGS. 5 to 8. The computer program may be on a carrier, for example a signal, or a computer readable medium for example a hard disk, an optical disc, a magneto-optical disk, a compact disc, a magnetic tape, electronic memory including Flash memory, ROM and RAM, a RAID or any other suitable storage device.

Variants

The above embodiments are to be understood as illustrative examples of the invention. Further embodiments of the invention are envisaged. For example, although the invention has been described by way of example with reference to a networked computer system, it may be applied to a single computer in which the user creates and stores the list of "good processes" or downloads a list of good processes from another computer via the Internet for example.

Instead of storing the list on a PC 2$n$, the list may be stored elsewhere on the network for example in the database and a link to list may be stored on the PC.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of controlling power consumption in a computer having a plurality of selectable power states, the method comprising using a power management program installed on the computer to:
   detect whether or not there is any user activity;
   detect the identity of each process running on the computer;
   compare the identity of each process running on the computer with a set of identities of previously identified processes for which it is desirable that the computer maintains a high power state;
   cause the computer to adopt a predetermined lower power state if all the detected identities of processes are not in said set and no user activity is detected, said predetermined lower power state being a state in which the computer is able to service requests.

2. A method according to claim 1, further comprising allowing the computer to select any of the power states if user activity is detected or a detected process identity is in said set.

3. A method according to claim 1, wherein said predetermined lower power state is a lowest power state in which the computer is able to service requests.

4. A method according to claim 3, wherein the step of causing the computer to adopt said lowest power state in which the computer is able to service requests comprises setting the clock of a CPU of the computer to its lowest frequency setting.

5. A method according to claim 3, wherein the step of causing the computer to adopt said lowest power state in which the computer is able to service requests comprises setting the clock of a CPU of the computer to its lowest frequency and setting the CPU to its lowest operating voltage.

6. A method according to claim 1, wherein a CPU of the computer has a plurality of power states P0 to P$n$ where P0 is a highest power state and P$n$, (where n>0), is/are a lower power state(s), and wherein said predetermined lower power state comprises a CPU power state lower than power state P0.

7. A method according to claim 1, wherein a CPU of the computer has a plurality of power states P0 to P$n$ where P0 is a highest power state and P$n$, n>0, is/are a lower power state(s), the method comprising:
   causing the CPU to adopt a lowest power state P$m$, where m is the highest value of n supported by the CPU, if all the detected identities of processes are not in said set and no user activity is detected, said lowest power state being a state in which the computer is able to service requests; and
   allowing the computer to adopt any one of the power states P0 to P$n$ otherwise.

8. A method according to claim 7, further comprising selecting any one of the power states according to the workload of the CPU if user activity is detected or a detected process identity is in said set.

9. A method according to claim 1, wherein said set of identities of previously identified processes is stored on the computer.

10. A method according to claim 9, further comprising the step of downloading said set of identities of previously identified processes from another computer.

11. A method according to according to claim 1, wherein a link to said set is stored on the computer and a power management program compares the detected identity of each process running on the computer with the set.

12. A method according to claim 1, wherein the step of detecting whether or not there is any user activity comprises periodically sampling for input activity with a preset sampling period and determining if there is absence of input activity over a preset time period longer than the sampling period.

13. A method according to claim 1, wherein said input activity comprises operation of a user input device.

14. A method according to claim 13, wherein the user input device is one or more of a keyboard and a pointing device.

15. The method of claim 1, wherein said method is implemented by a computer adapted to execute program instructions defining steps of said method, and wherein a CPU of the computer has a plurality of power states including a highest power state and at least one lower power state including said predetermined lower power state.

16. A tangible and non-transient computer readable medium storing a computer program which when run on a computer causes the computer to implement the steps of:
   detecting whether or not there is any user activity;
   detecting the identity of each process running on the computer;
   comparing the identity of each process running on the computer with a set of identities of previously identified processes for which it is desirable that the computer maintains a high power state; and
   causing the computer to adopt a predetermined lower power state if all the detected identities of processes are not in said set and no user activity is detected, said predetermined lower power state being a state in which the computer is able to service requests.

17. A method of controlling power consumption in a computer, wherein a CPU of the computer has a plurality of power states P0 to P$n$ where P0 is a highest power state and P$n$, n>0, is/are a lower power state(s), the method comprising using a power management program installed on the computer to:
   cause the CPU to adopt a lowest power state P$m$, where m is the highest value of n supported by the CPU, if all the detected identities of processes are not in a set of identities of previously identified processes for which it is desirable that the computer maintains a high power state, and no user activity is detected, said lowest power state being a state in which the computer is able to service requests; and
   allow the computer to adopt any one of the power states P0 to P$n$ otherwise.

18. A tangible and non-transient computer readable medium storing a power management program which, when executed by a computer, adapts the operation of the computer to control power consumption in the computer, wherein a CPU of the computer has a plurality of power states P0 to P$n$, where P0 is a highest power state and P$n$, n>0, is/are a lower power state(s),
   the program causing:
   the CPU to adopt the lowest power state P$m$, where m is the highest value of n supported by the CPU, if all the detected identities of processes are not in a set of identities of previously identified processes, deemed to be processes for which it is desirable that the computer maintains a high power state and no user activity is detected, said lowest power state being a state in which the computer is able to service requests; and
   the computer to adopt any one of the power states P0 to P$n$ otherwise.

19. The tangible and non-transient computer readable medium of claim 18, wherein said power management program stored thereon further adapts the operation of said computer to select any one of the power states according to the workload of the CPU if user activity is detected or a detected process identity is in said set.

* * * * *